US008290878B2

(12) United States Patent
Taylor

(10) Patent No.: US 8,290,878 B2
(45) Date of Patent: Oct. 16, 2012

(54) RENTAL RETURN METHOD AND APPARATUS

(75) Inventor: Jason W. Taylor, Atlanta, GA (US)

(73) Assignee: NCR Corporation, Duluth, GA (US)

( * ) Notice: Subject to any disclaimer, the term of this patent is extended or adjusted under 35 U.S.C. 154(b) by 2512 days.

(21) Appl. No.: 10/013,378

(22) Filed: Dec. 11, 2001

(65) Prior Publication Data

US 2003/0106745 A1 Jun. 12, 2003

(51) Int. Cl.
*G06Q 10/00* (2012.01)

(52) U.S. Cl. .......................................................... 705/307

(58) Field of Classification Search ................... 705/1.1, 705/307

See application file for complete search history.

(56) References Cited

U.S. PATENT DOCUMENTS

| | | | | |
|---|---|---|---|---|
| 4,839,505 | A * | 6/1989 | Bradt et al. | 235/381 |
| 4,884,212 | A * | 11/1989 | Stutsman | 700/237 |
| 4,903,815 | A | 2/1990 | Hirschfeld et al. | |
| 4,997,076 | A | 3/1991 | Hirschfeld et al. | |
| 5,361,913 | A | 11/1994 | Melchionna | |
| 5,699,262 | A | 12/1997 | Lang et al. | |
| 6,010,239 | A * | 1/2000 | Hardgrave et al. | 700/213 |
| 6,407,346 | B1 * | 6/2002 | Baker | 177/83 |
| 6,651,821 | B2 * | 11/2003 | Ratesic | 209/592 |
| 6,842,115 | B1 * | 1/2005 | Harris et al. | 340/572.1 |
| 6,905,030 | B2 * | 6/2005 | Ratesic | 209/645 |
| 2001/0016800 | A1 * | 8/2001 | Koh et al. | 702/188 |
| 2002/0035515 | A1 * | 3/2002 | Moreno | 705/26 |
| 2002/0195491 | A1 * | 12/2002 | Bunch, III | 235/385 |

* cited by examiner

*Primary Examiner* — Dennis Ruhl
(74) *Attorney, Agent, or Firm* — Paul W. Martin

(57) ABSTRACT

There is provided a rental item return apparatus including an opening to receive returned rental items, a store area for returned items and a chute arranged to connect the opening to the store area. The apparatus further includes a device arranged within the chute to uniquely identify and log each returned rental item.

19 Claims, 2 Drawing Sheets

RENTAL RETURN METHOD AND APPARATUS

This invention relates to method of and apparatus for the return of rental items, such as videotapes.

BACKGROUND TO THE INVENTION

The return of rental items of value, such as videotapes or library books, is ideally facilitated by face to face contact between the borrower of the item and a member of staff of the organization from whom the item was borrowed. In this way there is confirmation of return of the item which gives peace of mind to both the borrower and the organization personnel. However, if return is to be allowed outside of normal working hours then this type of face to face return is not cost effective. To date, for example with videotapes, this problem has been addressed by the use of an out of hours return box. This type of box tends to comprise a slot that is accessible by a borrower or user and a secure store that is not accessible by users. The slot and secure store are normally connected via a slide or chute so that returned items fall, safely and without damage, into the store.

However, problems may arise if there is a conflict between borrower and the store. For example, the borrower may allege that he or she returned an item using this out of hours box even if the item can not be found in the box. This may arise due to fraud, on the part of the borrower, the lender's personnel or a third party. Such problems may also arise due to something as simple as the misplacement of the item after it was correctly returned by the borrower.

Accordingly, it is a general object of the present invention to overcome or at least mitigate the problems experienced by video stores and the like, as identified above.

SUMMARY OF THE INVENTION

According to a first aspect of the invention there is provided a rental item return apparatus including an opening to receive returned rental items, a store area for returned items and a chute arranged to connect the opening to the store area; and a device arranged within the chute to uniquely identify and log each returned rental item.

Preferably, the apparatus includes a second chute arranged to redirect returned items back to the user for resubmission, if the scanner failed to uniquely identify the item.

Preferably, the device arranged within the chute to uniquely identify and log each returned rental item is a barcode scanner.

Preferably, the apparatus further comprises a scale arranged to weigh each returned retail item, to ensure that each item is of the correct weight. In one embodiment the scale is arranged to weigh returned video rental boxes, to ensure that the video rental boxes contain videos.

Preferably, the apparatus further comprises a second store area and a gate and a third chute arranged to divert items the weight of which falls outside of a predetermined weight range.

Preferably, the apparatus comprises a confirmation indicator arranged to inform the user that the item has been returned correctly. In one embodiment the confirmation indicator is a display screen.

Preferably, the apparatus further comprises a receipt printer.

According to a second aspect of the invention there is provided a method of receiving returned items, utilizing an apparatus including an opening to receive returned rental items, a store area for returned items and a chute arranged to connect the opening to the store area; and a device arranged within the chute to uniquely identify and log each returned rental item, including the steps of:

a) scanning returned items as they slide down the chute past the scanner.

Preferably, the method includes the step of redirecting returned items back to the user for resubmission, if the scanner failed to uniquely identify the item.

Preferably, the method includes the step of weighing the returned retail item, to ensure that the item is of the correct weight.

Preferably, the method includes the step of diverting items, the weight of which falls outside of a predetermined weight range, to a second store area.

Preferably, the method includes the step of indicating to a user when the item has been correctly returned.

Preferably, the method includes the step of providing the user with a printed receipt.

It is an advantage of the present invention that as well as confirming return of items it also precludes the present need for store personnel to scan returned items of inventory manually, in order to maintain stock level or availability records.

BRIEF DESCRIPTION OF THE DRAWINGS

Embodiments of the invention will now be described, by way of example, and with reference to the drawings in which.

DETAILED DESCRIPTION OF THE PREFERRED EMBODIMENT OF THE INVENTION

Figure 1:
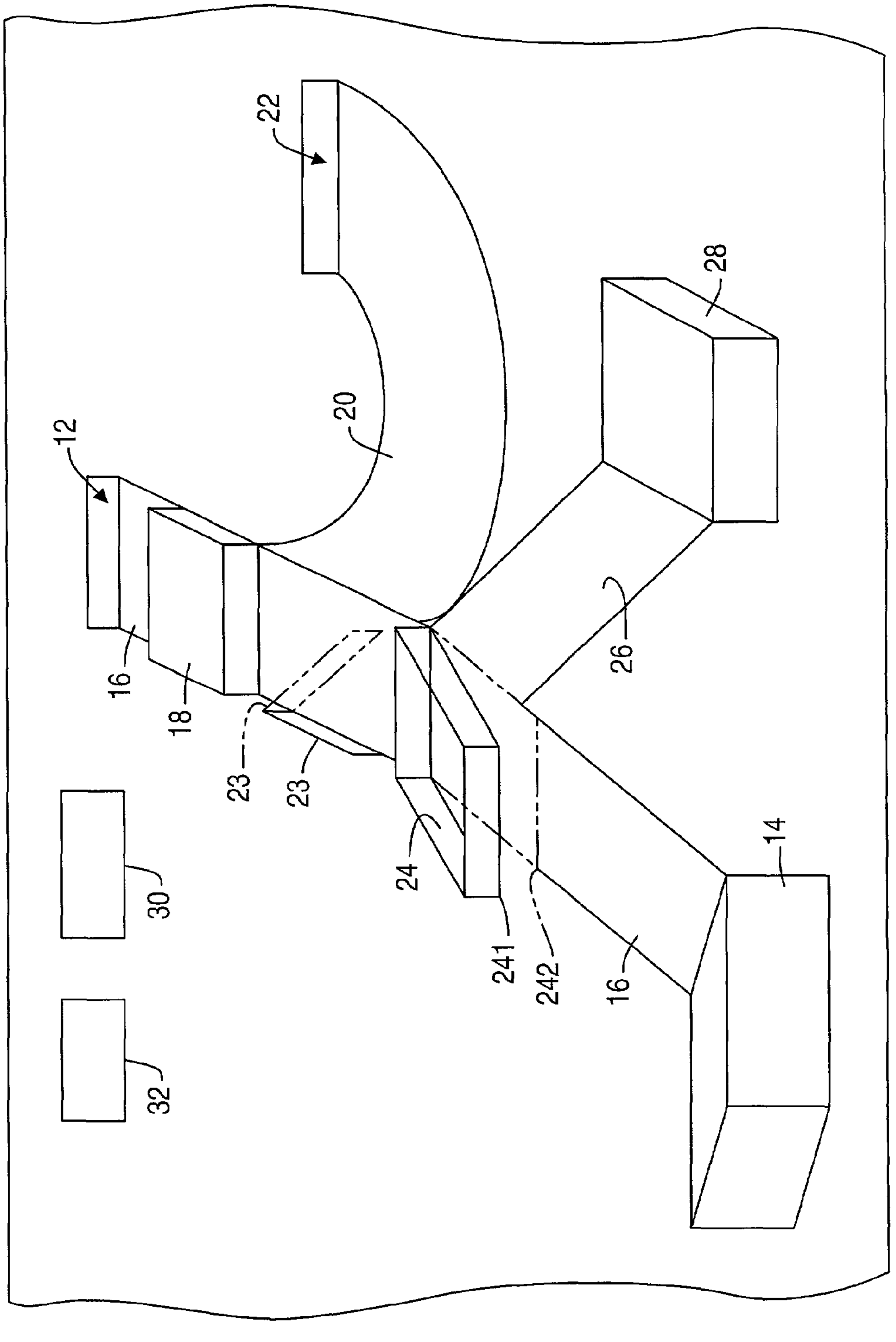
FIG. 1 is a schematic representation of an apparatus in accordance with the present invention.

FIG. 1 illustrates a video rental return apparatus 10, in accordance with the present invention. The apparatus 10 includes an opening, in the form of a slot 12, and a store area 14 for returned videos. The slot 12 and store area 14 are connected via a chute 16. A scanner 18 is located within the chute 16 adjacent the base of the chute 16 to uniquely identify and log returned videos. The apparatus further includes an optional return chute 20 to return videos to the user, via a return slot 22, for resubmission, if the scanner failed to scan the video correctly. A gate 23 is hingably mounted so as to be movable into a position in which incorrectly scanned videos are diverted to the second chute 20.

A weighing scale 24 is located within the chute 16, in the path of the video; so as to weigh the returned video box to determine that the box contains a video. This is achieved by setting a predetermining weight range that correspond to a video and box.

In this embodiment the scale is pivotable between a first position 241 in which the scale weighs the incoming video, and a second position 242 in which the video is directed along the chute 16 to the store area.

In one embodiment the scale can pivot to a third position (not shown) in which the video is diverted via a further chute 26 to a second store area 28. Videos are thus diverted when their weight lies outside of the predetermined weight range, indicating that the video box does not contain a video.

The apparatus further includes both a screen 30 arranged to notify a user when a video has been accepted by the apparatus 10 and a receipt printer 32 arranged to provide the user with a printed receipt, when the video has been accepted by the apparatus.

Figure 2:
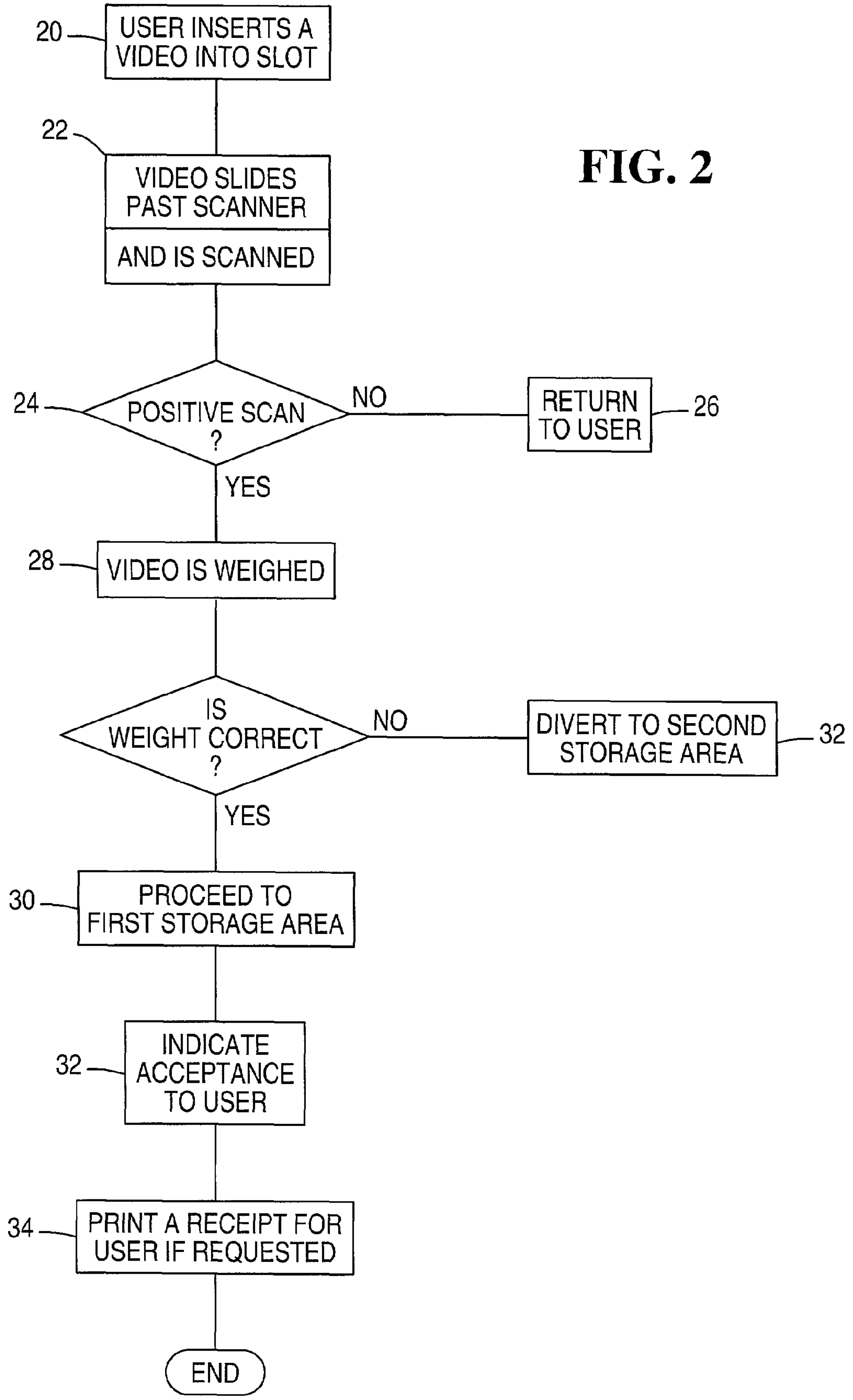
FIG. 2 is a flow diagram of a method of operation of the apparatus of FIG. 1 in accordance with the present invention.

FIG. 2 is a flow diagram illustrating the use of the apparatus of FIG. 1 to uniquely identify and log returned videos. Firstly, a user inserts a video into a slot 12 (box 20). The video then slides past a bar code scanner 18 and a barcode on the video box (not shown) is scanned (box 22). If the scan is not positive and the video can not be identified (box 24) then the video is diverted back to the user (box 26). However, if the scan is positive then the video is allowed to progress down the chute 1 to a scale 24 where the video is weighed (box 28). If the weight of the video lies within a predetermined acceptable range then the video is allowed to fall into a first storage area (box 30). However, if the weight of the video falls outside of the predetermined range then the video is diverted to a second storage area (box 32).

When the video is accepted a display screen 30 displays a message to that effect to the user (box 32). Finally, if requested by the user a receipt printer 32 will print a receipt for the user (box 32).

Modifications may be incorporated without departing from the scope of the present invention. For example, incorrectly scanned videos or those that fall outside of the predetermined acceptable weight range may be stored in a single storage area with the remaining videos. Alternatively, they may be returned to the user and the receipt printer or display screen may be utilized to inform the user of the problem with the video being returned.

The invention claimed is:

1. A rental item return apparatus comprising:

an opening to receive returned rental items;

a store area for returned items;

a chute arranged to connect the opening to the store area, the chute being disposed so that items placed within the chute slide down the chute under the propulsion of gravity; and a bar code scanner disposed so as to scan a bar code affixed to each return rental item to uniquely identify and log each returned rental item, scanning of the bar code being performed as the return rental item slides down the chute under the propulsion of gravity.

2. An apparatus as claimed in claim 1, further comprising a second chute arranged to redirect returned items back to the user for resubmission, if the scanner failed to uniquely identify the item.

3. An apparatus as claimed in claim 1, wherein the opening is a slot.

4. An apparatus as claimed in claim 1, further comprising a receipt printer.

5. The rental item return apparatus of claim 1, further comprising:

a second chute arrange to redirect returned items back to the user for resubmission, the second chute arranged so that the items are directed down the second chute and back to the user under the propulsion of gravity; and a direction control mechanism disposed and configured to allow returned items to continue down the first chute if the scanner uniquely identifies the item and to direct the returned items down the second chute if the scanner fails to uniquely identify the item.

6. The rental return apparatus of claim 1, further comprising:

a scale for determining if a returned item falls within a predetermined weight range, the scale pivoting between a first position for weighing of the returned item, a second, and a third position depending on whether the returned item falls within a predetermined weight range, the second position directing the returned item to the store area, and the third position directing the returned item to a location for returned items falling outside of the predetermined weight range.

7. The method of claim 1, further comprising steps of:

utilizing a scale in a first position for weighing the returned item;

upon weighing of the returned item and determining that the item falls within a predetermined weight range for the item, pivoting the scale to a second position so as to direct the returned item into the store area; and upon weighing the item and determining it falls outside a predetermined weight range for the item, pivoting the scale to a position so as to direct the returned item to a location for items failing to fall within predetermined weight ranges for the items.

8. An apparatus as claimed in claim 1, further comprising a confirmation indicator arranged to inform the user that the item has been returned correctly.

9. An apparatus as claimed in claim 8, wherein the confirmation indicator is a display screen.

10. An apparatus as claimed in claim 1, further comprising a scale arranged to weigh each returned retail item, to ensure that each item is of the correct weight.

11. An apparatus as claimed in claim 10, wherein the scale is arranged to weigh returned video rental boxes, to ensure that the video rental boxes contain videos.

12. An apparatus as claimed in claim 10, further comprising a second store area and a gate and a third chute arranged to divert items the weight of which falls outside of a predetermined weight range.

13. A method of receiving returned items, utilizing an apparatus including an opening to receive returned rental items, a store area for returned items and a chute arranged to connect the opening to the store area; and a bar code scanner arranged so as to uniquely identify and log each returned rental item, including the steps of:

receiving returned items placed within the opening; and scanning a bar code affixed to each of the returned items as it slides under the propulsion of gravity down the chute past the scanner, so as to identify and log the returned item.

14. A method as claimed in claim 13, including the step of redirecting returned items back to the user for resubmission, if the scanner failed to uniquely identify the item.

15. A method as claimed in claim 13, including the step of indicating to a user when the item has been correctly returned.

16. A method as claimed in claim 13, including the step of providing the user with a printed receipt.

17. The method of claim 13, further comprising the steps of:

controlling a direction control mechanism so that a returned item continues down the first chute if the scanner successfully identifies the item; and directing the returned item down a second chute so as to proceed under the propulsion of gravity back to the customer if the scanner fails to uniquely identify the item.

18. A method as claimed in claim 13, including the step of weighing the returned rental item, to ensure that the item is of the correct weight.

19. A method as claimed in claim 13, including the step of diverting items, the weight of which falls outside of a predetermined weight range, to a second store area.

* * * * *